(12) United States Patent
Asaad et al.

(10) Patent No.: US 10,387,403 B2
(45) Date of Patent: Aug. 20, 2019

(54) DATA FILTERING USING A PLURALITY OF HARDWARE ACCELERATORS

(71) Applicant: International Business Machines Corporation, Armonk, NY (US)

(72) Inventors: Sameh W. Asaad, Briarcliff Manor, NY (US); Robert J. Halstead, Alta Loma, CA (US); Bharat Sukhwani, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 1079 days.

(21) Appl. No.: 14/791,832

(22) Filed: Jul. 6, 2015

(65) Prior Publication Data
US 2016/0292209 A1 Oct. 6, 2016

Related U.S. Application Data

(63) Continuation of application No. 14/672,630, filed on Mar. 30, 2015.

(51) Int. Cl.
| G06F 16/00 | (2019.01) |
| G06F 16/23 | (2019.01) |
| G06F 16/2455 | (2019.01) |
| G06F 16/245 | (2019.01) |

(52) U.S. Cl.
CPC .... *G06F 16/2365* (2019.01); *G06F 16/24554* (2019.01); *G06F 16/24569* (2019.01)

(58) Field of Classification Search
CPC ........... G06F 16/2365; G06F 16/24554; G06F 16/24569
See application file for complete search history.

(56) References Cited

U.S. PATENT DOCUMENTS

| 7,636,703 B2 | 12/2009 | Taylor |
| 7,917,299 B2 | 3/2011 | Buhler et al. |
| 8,018,940 B2 * | 9/2011 | Hao ........................ H04L 45/00 370/392 |
| 8,571,023 B2 | 10/2013 | Panwar et al. |
| 8,805,850 B2 | 8/2014 | Sukhwani et al. |
| 2004/0039940 A1 * | 2/2004 | Cox ........................ H04L 29/06 709/224 |

(Continued)

OTHER PUBLICATIONS

E. Brossard et al., "A Model for Programming Data-Intensive Applications on FPGAs: A Genomics Case Study," Proceedings of the Symposium on Application Accelerators in High Performance Computing (SAAHPC), Jul. 2012, pp. 84-93.

(Continued)

*Primary Examiner* — Paul Kim
(74) *Attorney, Agent, or Firm* — Vazken Alexanian; Ryan, Mason & Lewis, LLP

(57) ABSTRACT

Techniques are provided for data filtering using hardware accelerators. An apparatus comprises a processor, a memory and a plurality of hardware accelerators. The processor is configured to stream data from the memory to a first one of the hardware accelerators and to receive filtered data from a second one of the hardware accelerators. The plurality of hardware accelerators are configured to filter the streamed data utilizing at least one bit vector partitioned across the plurality of hardware accelerators. The hardware accelerators may be field-programmable gate arrays.

20 Claims, 9 Drawing Sheets

(56) References Cited

U.S. PATENT DOCUMENTS

2013/0238897 A1  9/2013  Mashatan et al.
2013/0318051 A1  11/2013  Kumar et al.
2016/0285473 A1* 9/2016  Kim .................. H03M 7/6029

OTHER PUBLICATIONS

O. Cret et al., "A Hardware Algorithm for the Exact Subsequence Matching Problem in DNA Strings," Romanian Journal of Information Science and Technology, Jan. 2009, pp. 51-67, vol. 12, No. 1.

L. Ma et al., "Bloom Filter Performance on Graphics Engines," Proceedings of the International Conference on Parallel Processing (ICPP), Sep. 2011, pp. 522-531, Taipei City, Taiwan.

A. Nikitakis et al., "A Memory-Efficient FPGA-Based Classification Engine," Proceedings of the 16th International Symposium on Field-Programmable Custom Computing Machines (FCCM), Apr. 2008, pp. 53-62.

W. Vanderbauwhede et al., "FPGA-Accelerated Information Retrieval: High-Efficiency Document Filtering," Proceedings of the International Conference on Field Programmable Logic and Applications (FPL), Aug.-Sep. 2009, pp. 417-422, Prague, Czech Republic.

Paraschos Koutris, "Bloom Filters in Distributed Query Execution," University of Washington, CSE 544 Project, Winter 2011, 7 pages.

R.J. Halstead et al., "Accelerating Join Operation for Relational Databases with FPGAs," Proceedings of the IEEE 21st Annual International Symposium on Field-Programmable Custom Computing Machines (FCCM), Apr. 2013, pp. 17-20.

J.P. Walters et al., "MPI-HMMER-Boost: Distributed FPGA Acceleration," The Journal of VLSI Signal Processing System for Signal, Image, and Video Technology, Sep. 2007, pp. 223-238, vol. 48, No. 3.

S. Dharmapurikar et al., "Deep Packet Inspection Using Parallel Bloom Filters," IEEE Micro, Jan.-Feb. 2004, pp. 52-61, vol. 24, No. 1.

M. Attig et al., "Implementation Results of Bloom Filters for String Matching," Proceedings of the 12th Annual IEEE Symposium on Field-Programmable Custom Computing Machines (FCCM), Apr. 2004, pp. 322-323.

H. Song et al., "Fast Hash Table Lookup Using Extended Bloom Filter: An Aid to Network Processing," Proceedings of the Conference on Applications, Technologies, Architectures, and Protocols for Computer Communications (ACM SIGCOMM), Aug. 2005, pp. 181-192, vol. 35, No. 4.

D.C. Suresh et al., "Automatic Compilation Framework for Bloom Filter Based Intrusion Detection," International Workshop on Applied Reconfigurable Computing (ARC 2006), Mar. 2006, 7 pages.

List of IBM Patents or Patent Applications Treated as Related.

* cited by examiner

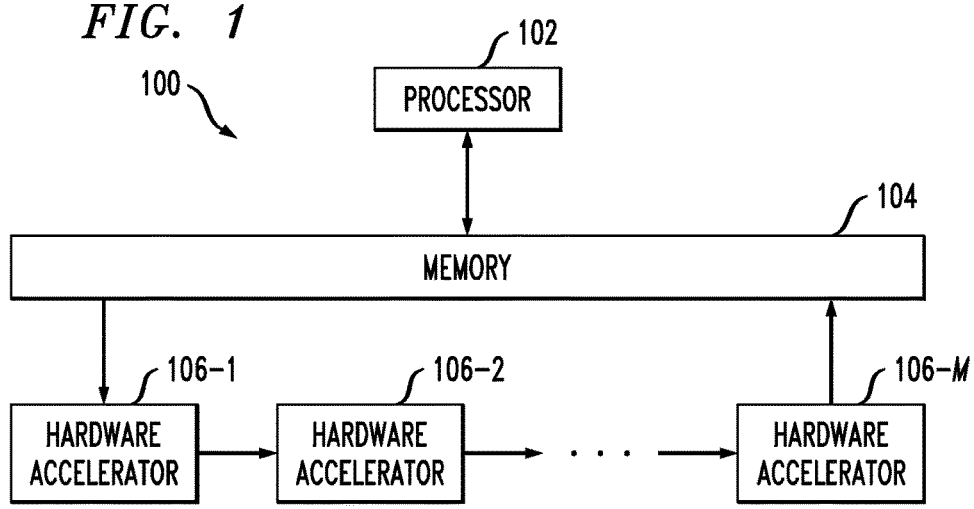
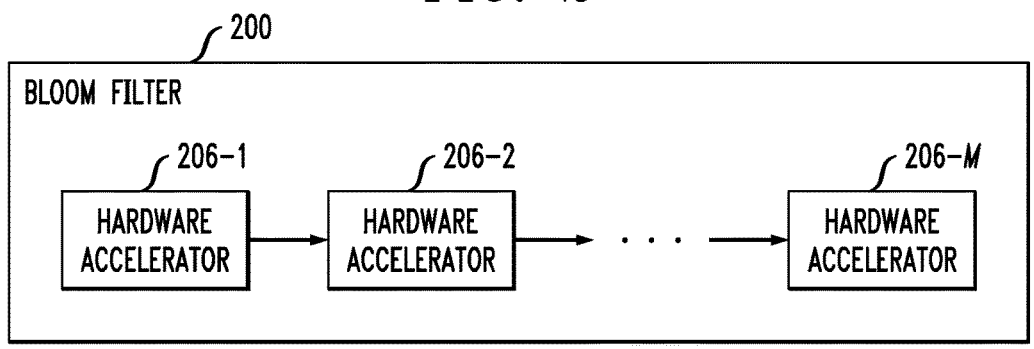
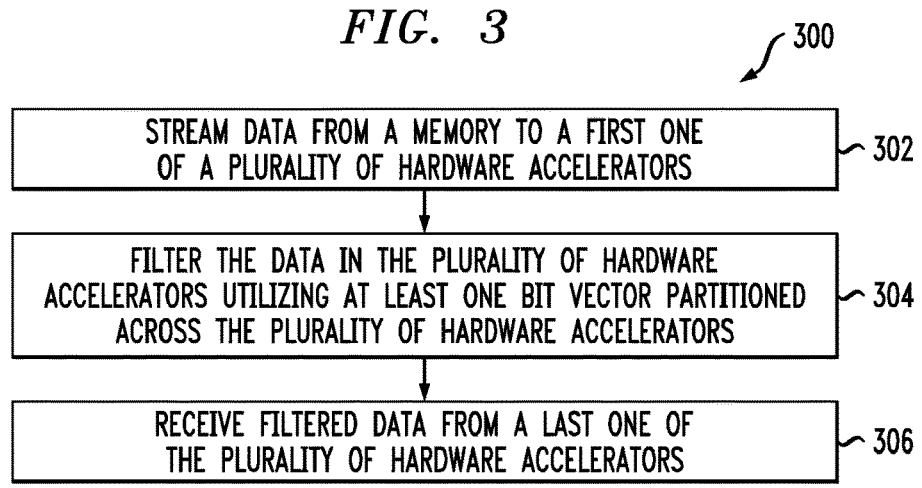

FIG. 4
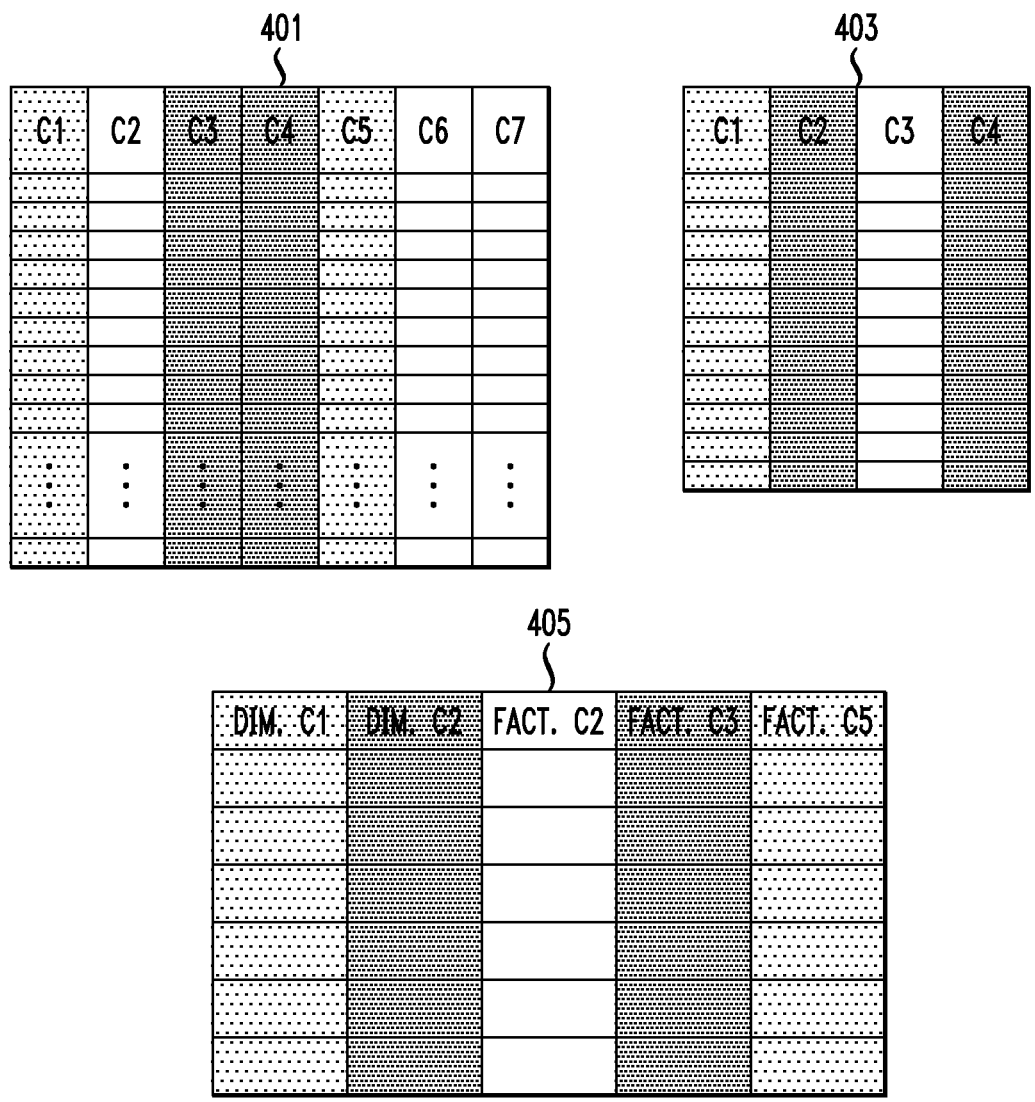
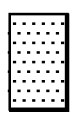 LOCAL PREDICATE NEEDS TO BE EVALUATED ON THIS COLUMN
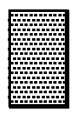 JOIN PREDICATE NEEDS TO BE EVALUATED ON THIS COLUMN

DATA FILTERING USING A PLURALITY OF HARDWARE ACCELERATORS

CROSS-REFERENCE TO RELATED APPLICATION

This application is a Continuation of U.S. patent application Ser. No. 14/672,630, filed on Mar. 30, 2015, the disclosure of which is incorporated by reference herein.

FIELD

The field relates to data filtering and, more particularly, to hardware-accelerated data filtering.

BACKGROUND

Modern databases, such as those used for processing business data, typically must handle large numbers of complex queries as well as large datasets. Business data in these databases may comprise information relating to customers, products, orders, employees, etc. Basic and complex queries of such large datasets can be computationally expensive. For example, queries relating to a particular customer's order history or purchased products or queries relating to which employees processed a particular order, may need to be performed continuously. The amount of business data which is queried can lead to computationally expensive operations.

SUMMARY

Embodiments of the invention provide techniques for hardware-accelerated data filtering.

For example, in one embodiment, an apparatus comprises a processor, a memory and a plurality of hardware accelerators. The processor is configured to stream data from the memory to a first one of the hardware accelerators and to receive filtered data from a second one of the hardware accelerators. The plurality of hardware accelerators are configured to filter the streamed data utilizing at least one bit vector partitioned across the plurality of hardware accelerators.

In another embodiment, a Bloom filter comprises a plurality of hardware accelerators. At least one bit vector for the Bloom filter is partitioned across the plurality of hardware accelerators.

In another embodiment, a method comprises streaming data from a memory to a first one of a plurality of hardware accelerators, filtering the data in the plurality of hardware accelerators utilizing at least one bit vector partitioned across at least two of the plurality of hardware accelerators, and receiving filtered data from a second one of the plurality of hardware accelerators.

Advantageously, one or more embodiments of the invention allow for effective filtering of large datasets without increasing a false positive rate.

These and other embodiments of the invention will become apparent from the following detailed description of illustrative embodiments thereof, which is to be read in connection with the drawings.

BRIEF DESCRIPTION OF THE DRAWINGS

FIG. 1 illustrates a system comprising a plurality of hardware accelerators, according to an embodiment of the invention.

FIG. 2 illustrates a Bloom filter formed using a plurality of hardware accelerators, according to an embodiment of the invention.

FIG. 3 illustrates a process for filtering data, according to an embodiment of the invention.

FIG. 4 illustrates an example of tables which may be filtered, according to an embodiment of the invention.

DETAILED DESCRIPTION

Figure 5:
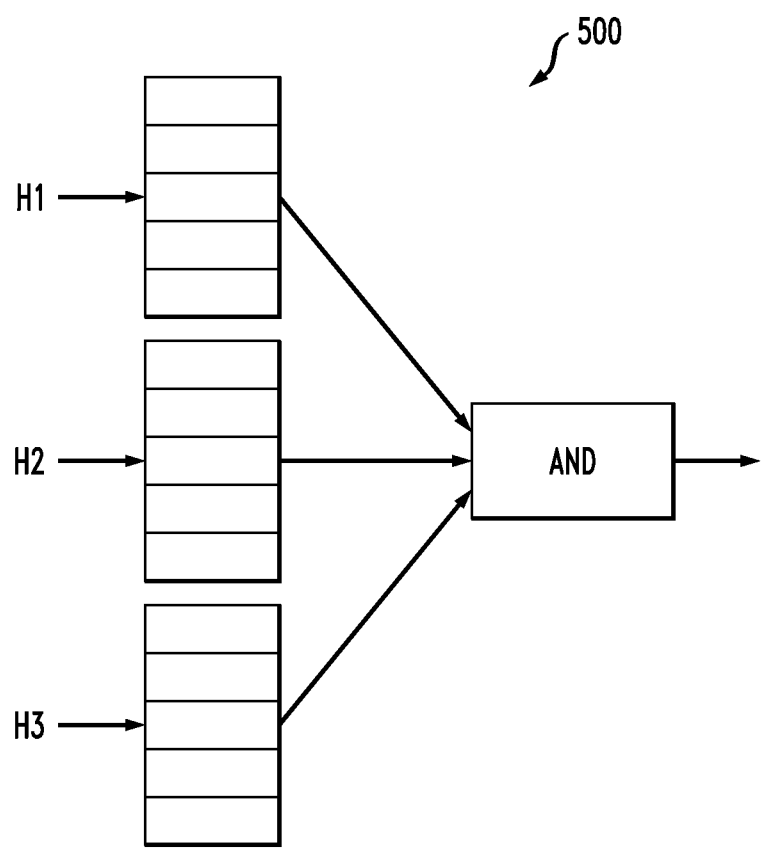
FIG. 5 illustrates filtering using a plurality of hash functions, according to an embodiment of the invention.

Illustrative embodiments of the invention may be described herein in the context of illustrative apparatus, systems, architectures and methods for data filtering. However, it is to be understood that embodiments of the invention are not limited to the illustrative apparatus, systems, architectures and methods described but are more broadly applicable to other suitable apparatus, system, architectures and methods.

Embodiments provide techniques for scaling a Bloom filter across multiple hardware accelerators, allowing for effective filtering of large datasets without increasing a false positive rate. Various embodiments are described below in the context of a hash join algorithm for a relational database, but embodiments are not limited solely to hash join algorithms in a relational database. Embodiments are more broadly applicable to various other types of hash and Bloom filter based filtering, including other types of database joins, string matching, query processing, etc.

A Bloom filter may be implemented on a single hardware accelerator. Similarly a hashing operation may be performed by a single hardware accelerator. Scaling a Bloom filter or hashing operation to multiple accelerators represents a challenge. Embodiments allow for such scaling without the need to explicitly partition the data to be filtered.

Explicit partitioning of data by a host can allow the host to distribute partitioned data to multiple nodes which work separate from one another. By avoiding partitioning of the data to be filtered, embodiments can reduce and simplify the host's logic such that a host need only stream data into one channel and out of one channel regardless of the number of accelerators used to filter the data.

A Bloom filter may be separated across multiple processors. Each processor can hold a partition of the entire table, and use its partition to generate part of the Bloom filter. In a first approach, each processor or node works separately to create a full Bloom filter (bit vectors) for the entire table, but only populates the filter vectors based on its local partition. To get the final Bloom filter, all of the full Bloom filters from the different nodes are ORed together. In a second approach, each processor or node works separately to create a small Bloom filter for its partition, and populates its small Bloom filter. To get the final Bloom filter, all the small Bloom filters from the different nodes are concatenated together. In both the first and second approaches, multiple look-ups are required to determine a match. Work is done on separate nodes and must be joined together later by the host. Embodiments allow for implementing a distributed Bloom filter utilizing a plurality of hardware accelerators which does not require the host to do the extra work of combining results from different nodes.

Filtering a large dataset using a Bloom filter requires large bit vectors. The limited available memory in a hardware accelerator such as a field-programmable gate array (FPGA) limits the dataset sizes. Embodiments provide techniques for scaling bit vectors on multiple accelerators such as FPGAs to allow for filtering of large datasets.

Distributing a single Bloom filter across multiple accelerators allows for increasing the size of the Bloom filter to handle more data without hurting the false positive rate. In some embodiments, accelerators are daisy-chained together, allowing a Bloom filter to scale to any desired number of accelerators. In such an arrangement, the host only needs to stream data to a single one of the accelerators and only needs to read results back from a single one of the accelerators. The host is not required to split the input data or merge the output data. Distinct ranges may be assigned to each accelerator, and each accelerator is populated based on its value range. Each accelerator is searched based on its value range, and state information is stored with each value as the values pass through the accelerators. The state information allows the final or last accelerator in the chain to decide if a particular value should or should not be dropped.

One advantage of this design is that it requires only two channels to the host. A first channel is used to write data values to a first accelerator, and a second channel is used to read data values from a second accelerator. In this way, bandwidth is not over utilized by broadcasting the same data to multiple accelerators.

FIG. 1 illustrates a system 100, which includes a processor 102, a memory 104 and a plurality of hardware accelerators 106-1, 106-2, . . . , 106-M.

The processor 102 may be a central processing unit (CPU), a microprocessor, and application-specific integrated circuit (ASIC), an arithmetic logic unit (ALU), a digital signal processor (DSP), a FPGA, or other similar processing device component, as well as combinations of these and other circuitry.

The memory 104 may be any type of a local or remote storage memory, including but not limited to a hard disk, flash storage, random access memory (RAM), read only memory (RAM), data stored on an intranet or internet server or storage device, or other types of storage devices in any combination.

The hardware accelerators 106-1, 106-2, . . . , 106-M may each comprise a FPGA. In other embodiments, one or more of the hardware accelerators 106 may be an ASIC or other type of accelerator. As shown, the hardware accelerators 106-1, 106-2, . . . , 106-M are connected together in a daisy-chain fashion. At least one bit vector is partitioned across the hardware accelerators 106-1, 106-2, . . . , 106-M. The hardware accelerators 106-1, 106-2, . . . , 106-M may form a Bloom filter.

The processor 102 is configured to stream data from the memory 104 to hardware accelerator 106-1. The data is filtered by the hardware accelerators 106-1, 106-2, . . . , 106-M, and the processor 102 receives filtered data from the hardware accelerator 106-M. As will be described in further detail below, data filtering in the hardware accelerators 106 may comprise a build phase and a probe a phase.

FIG. 2 illustrates a distributed Bloom filter 200, comprising hardware accelerators 206-1, 206-2, . . . , 206-M that are daisy-chain connected to one another. The Bloom filter 200 may be used by a host, such as a CPU or other processing device, for performing a variety of operations on datasets, including database joins, string matching, searches and other queries, etc. Similar to the hardware accelerators 106 described above with respect to the system 100, one or more bit vectors are partitioned across the hardware accelerators 206-1, 206-2, . . . , 206-M in the Bloom filter 200.

FIG. 3 illustrates a process 300 for filtering data. The process 300 may be performed in some embodiments by the system 100 or by a host using the Bloom filter 200. The process 300 includes streaming 302 data from a memory to a first one of a plurality of hardware accelerators, filtering 304 the data in the plurality of hardware accelerators utilizing at least one bit vector partitioned across the plurality of hardware accelerators, and receiving 306 filtered data from a last one of the plurality of hardware accelerators.

An example of a table join which may be performed using the system 100 or the Bloom filter 200 will now be described with reference to FIG. 4. FIG. 4 shows a fact table 401 and a dimension table 403, which may be part of a database that uses a data warehouse model splitting the data in the database between multiple tables. In the data warehouse model, dimension tables generally store redundant information that rarely changes while fact tables store target information. The fact tables have links to the dimension tables. Keys are unique identifiers used to link the tables. A database using the data warehouse model can store a large dataset. A large dataset may have millions of elements for dimension tables and billions of elements for fact tables.

FIG. 4 shows a returned table 405 for a query including a number of local predicates and join predicates. FIG. 4 shows the columns for which a local predicate needs to be evaluated shaded light gray and shows the columns for which join predicates need to be evaluated shaded dark gray. The particular query which returns table 405 is as follows:
SELECT dim.C1, dim.C2, fact.C2, fact.C3, fact.C5
WHERE dim.C1=5 and
dim.C2=fact.C3 and
dim.C4=fact.C4 and
fact.C1=3 and
fact.C5=10
In this query, dim.C1=5 represents a local predicate to be performed on the dimension table 403 and fact.C1=3 and fact.C5=10 represent local predicates to be performed on the fact table 401. The expressions dim.C2=fact.C3 and dim.C4=fact.C4 represent join predicates to be performed.

FIG. 5 illustrates filtering 500 using a plurality of different hash functions H1, H2 and H3. FIG. 5 shows membership checking for a key K, where K is hashed using the different hash functions H1, H2 and H3 resulting in hash values H1(K), H2(K) and H3(K). These hash values are used to read corresponding bit values from bit vectors, using the hash value as the address for the bit vectors. If the bits read from a bit vector are all "1" then the key K is assumed to be present, which may represent a true positive or a false positive. If any of the bits read from the bit vector are 0, the key is assumed to be not present, representing a true negative. A Bloom filter may yield false positives but does not yield false negatives.

Figure 6:
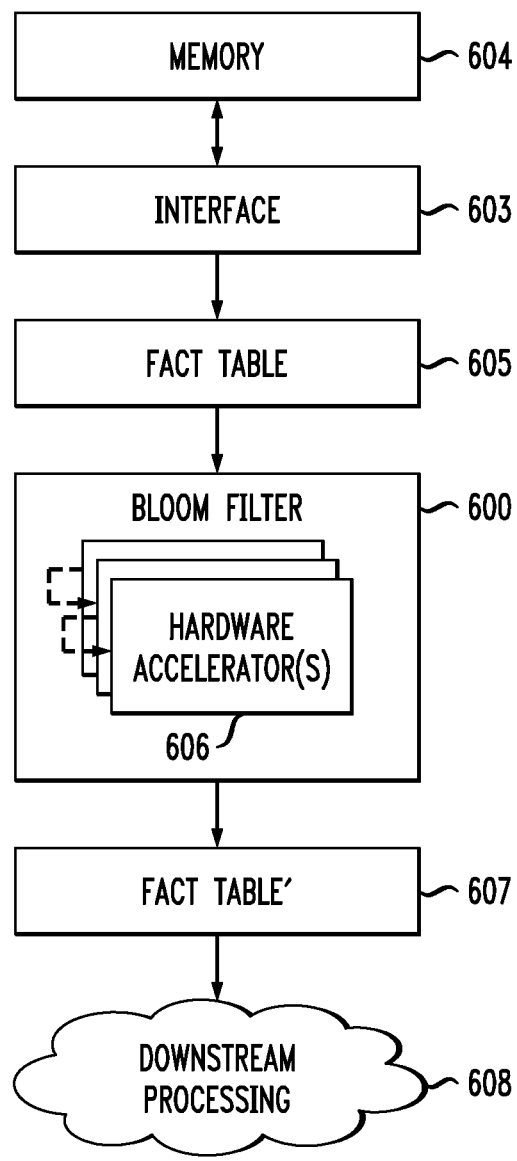
FIG. 6 illustrates system processing using a Bloom filter, according to an embodiment of the invention.

FIG. 6 illustrates processing of fact tables using a Bloom filter 600. FIG. 6 shows memory 604 connected to Bloom filter 600 via interface 603. The memory 604, similar to the memory 104 described above with respect to system 100, may be any type of a local or remote storage memory. The interface 603 may be any type of bus, including but not limited to a Peripheral Component Interconnects (PCI) bus, a PCI Express (PCIe) bus, a Universal Serial Bus (USB), etc.

The Bloom filter 600, similar to the Bloom filter 200, comprises hardware accelerators 606 daisy-chain connected to one another. The hardware accelerators 606 may be FPGAs, ASICs or other types of accelerators. A fact table 605 is streamed from the memory 604 to the Bloom filter 600 via the interface 603, under control of a host such as a CPU or other processing device (not shown in FIG. 6). The hardware accelerators 606 in the Bloom filter 600 eliminate the fact table rows that do not match the specified join criteria, returning a smaller, filtered fact table 607. The filtered fact table 607 is provided for further downstream processing 608.

As described above, the Bloom filter 600 is scaled across the hardware accelerators 606, providing support for larger bit vectors as compared to a Bloom filter using only a single accelerator. Scaling also allows for multiple bit vectors on each accelerator, providing better filtering. Daisy-chaining of the accelerators 606 allows for more effective utilization of the bus bandwidth of the interface 603, as there need only be a single data entry and a single data exit point. Advantageously, explicit input data partitioning and result gathering by the host is not required. The data streams through the chain of accelerators 606. Each accelerator sees and optionally "marks" the data as will be described in further detail below, while the last accelerator in the chain filters away unwanted data.

Figure 7:
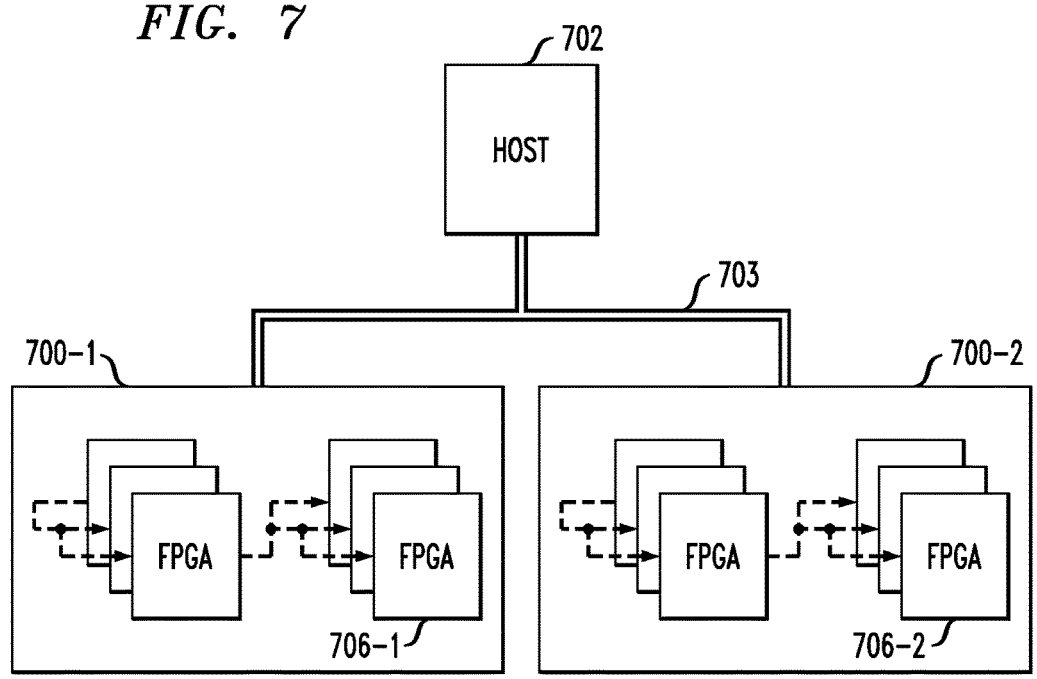
FIG. 7 illustrates an example architecture of a plurality of hardware accelerators, according to an embodiment of the invention.

FIG. 7 shows an architecture comprising a host 702 connected to a first card 700-1 and a second card 700-2 via interface 703. Card 700-1 includes 6 FPGAs 706-1 connected in a daisy chain and card 700-2 includes 6 FPGAs 706-2 connected in a daisy chain. Each card 700-1 and 700-2 may implement a separate Bloom filter, or a single Bloom filter may be scaled across both cards 700-1 and 700-2.

Figure 8:
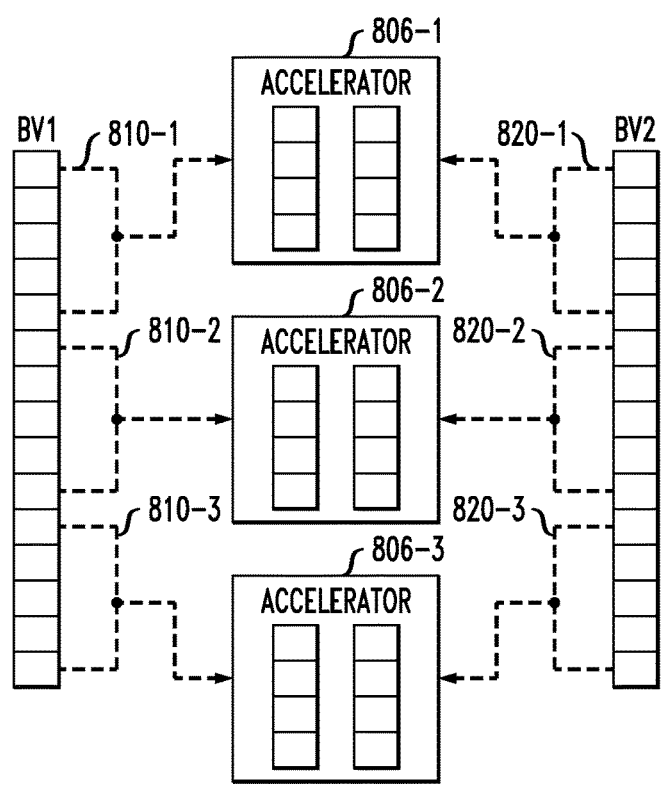
FIG. 8 illustrates partitioning of bit vectors, according to an embodiment of the invention.

FIG. 8 illustrates partitioning of bit vectors. FIG. 8 shows three accelerators 806-1, 806-2 and 806-3. It is important to note that while FIG. 8 shows only three accelerators, embodiments are not limited solely to partitioning a bit vector across three accelerators. Instead, one or more bit vectors may be partitioned across more or fewer than three accelerators.

A single Bloom filter data structure may be partitioned across the accelerators 806. The Bloom filter includes one or more unique hash functions and bit vectors. The exact number of hash functions and bit vectors may be chosen for the needs of a particular design. FIG. 8 shows a particular example where two bit vectors, denoted BV1 and BV2, are partitioned across accelerators 806-1, 806-2 and 806-3. Each of the accelerators 806-1, 806-2 and 806-3 holds a range of locations as shown in FIG. 8. Accelerator 806-1 holds the range of locations 810-1 for bit vector BV1 and the range of locations 820-1 for bit vector BV2, accelerator 806-2 holds the range of locations 810-2 for bit vector BV1 and the range of locations 820-2 for bit vector BV2, and accelerator 806-3 holds the range of locations 810-3 for bit vector BV1 and the range of locations 820-3 for bit vector BV2.

It is important to note that the range does not need to be the same for each of the accelerators. For example, one accelerator may have a range of 1000 positions while another accelerator has a range of 1500 positions. Similarly, the range of positions need not be the same for each bit vector. Within a given accelerator, the range for a first bit vector may be 1000 positions while the range for a second bit vector in that same accelerator is 2000 positions.

Before execution, each accelerator 806-1, 806-2 and 806-3 is programmed with the start and end values for its range. These values may be held within registers local to the respective accelerators 806-1, 806-2 and 806-3.

Filtering in some embodiments includes a build phase and probe phase. During the build phase, a Bloom filter is populated based on a set of values. Data is streamed into and out of each accelerator in the daisy chain, except for the last accelerator in the daisy chain which only streams data in. In various embodiments, the data is streamed in as packets holding values. During the probe phase, a different set of values is filtered with the Bloom filter by searching for matches to the values populated during the build phase. Positive results are returned to the host, while negative results are dropped at the last accelerator.

In the probe phase, a given value will map to one location within a bit vector, but the location may be on any accelerator in the daisy chain as the bit vector is partitioned across the accelerators in the daisy chain. To determine a match, extra flag bits are streamed through the accelerators in the daisy chain in addition to the value. The final accelerator uses the flags to determine a positive or negative match. The extra flag bits in some embodiments include one flag bit for each bit vector.

In some embodiments, a packet model is used wherein the data streamed comprises packets having a set of flags and a value to be filtered. With this model, each accelerator re-computes the hash value. Hardware accelerators such as FPGAs can pipeline and parallelize operations, but this may represent an issue for other types of hardware accelerators. The redundancy in computation of the hash value can be prevented by packaging hash indexes instead of the value. In this alternate model, the first accelerator in the daisy chain computes the indices and packages them. This alternate model, however, may increase bandwidth requirements as each bit vector has a unique index that needs to be packaged. Thus, the choice between these models involves tradeoffs in bandwidth utilization and redundant computation. The requirements of a particular application can be used for determining which model is most appropriate. For example, the choice between these models may be made at least in part based on whether the bits required to store all the indices is larger than the bits required to store just the value.

Streaming data to accelerators may include streaming multiple packets per cycle, if the particular architecture has the bandwidth to support it and the accelerators have the hardware to support it. FPGAs, as an example, may have a bus that provides 16 bytes per cycle. The block RAM (BRAM) local to a FPGA may have two read/write ports. For this example, two packets of 8 bytes can be streamed to the FPGA without any performance degradation. In the description that follows, the build phase and probe phase are discussed assuming that one packet arrives per cycle. Embodiments, however, are not limited to streaming one packet per cycle.

Figure 9:
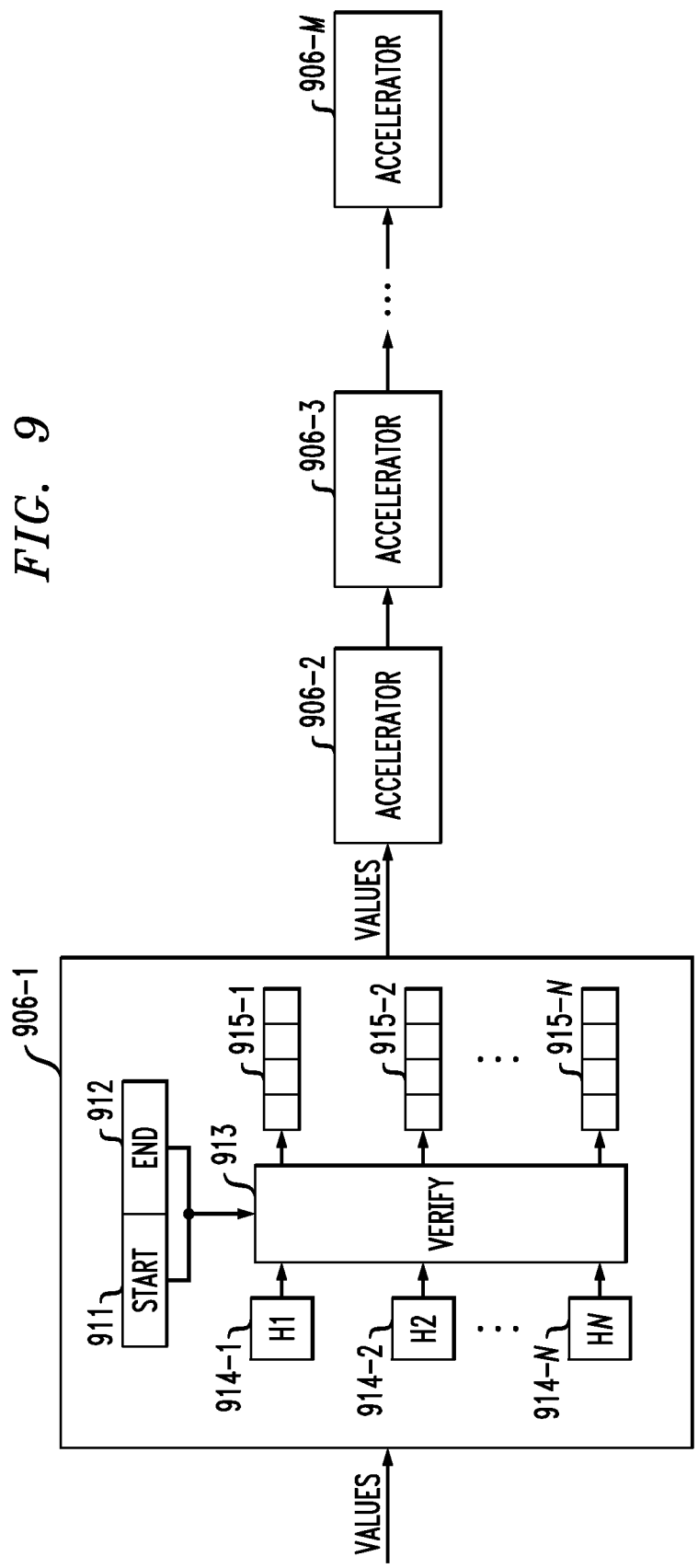
FIG. 9 illustrates a build phase, according to an embodiment of the invention.

FIG. 9 illustrates a build phase used in some embodiments. FIG. 9 shows accelerators 906-1, 906-2, 906-3, . . . , 906-M daisy-chain connected to one another. Accelerator 906-1 includes registers 911 and 912. As discussed above, before the build phase begins each accelerator is programmed with its ranges for one or more bit vectors. Register 911 stores the start of the range for accelerator 906-1 while register 912 stores the end of the range for accelerator 906-1. Values are streamed to the accelerator 906-1, and hashed by N hash functions 914-1, 914-2, . . . , 914-N in the accelerator 906-1 resulting in N indices. Each index is verified using verifier 913. It is possible for one or more indices to be in range while one or more other indices are not in range. If the index is within the range, the corresponding value in the bit vector 915-1, 915-2, . . . , 915-N is set. If the index is out of range, the corresponding bit vector is not updated. The values 915-1, 915-2, . . . , 915-N are then sent to the next accelerator 906-2.

The design in FIG. 9 supports N hash functions across M accelerators. In some embodiments, each of the M accelerators utilizes N hash functions to compute bit vector indices for its corresponding partitioned portion of at least one bit vector. In other embodiments, one of the M accelerators computes the bit vector indices and forwards the bit vector indices to the other accelerators.

In some embodiments, streaming the values to accelerator 906-1 includes streaming column values from a dimension table. The column values are hashed using the N hash functions 914, and checked to see if they are within the accelerator 906-1's range using verifier 913. Bit vectors are marked for any index within the range.

The probe phase used in some embodiments will now be described with reference to FIGS. 10-12. Each accelerator 906 may be programmed with the logic for both the build phase and the probe phase. A phase flag may be used to indicate which of the two phases is to be performed. The phase flag may be included in the packets streamed to the accelerators 906. Bit vectors are not flushed when the accelerators are switched from a build state to the probe state.

After the build phase, each accelerator is programmed with its bit vector ranges. The N most significant bits are used as flags to mark matches across accelerators as packets are streamed through the accelerators in the daisy chain during the probe phase. The values are ANDed together at the last accelerator in the chain to determine a final match.

Figure 10:
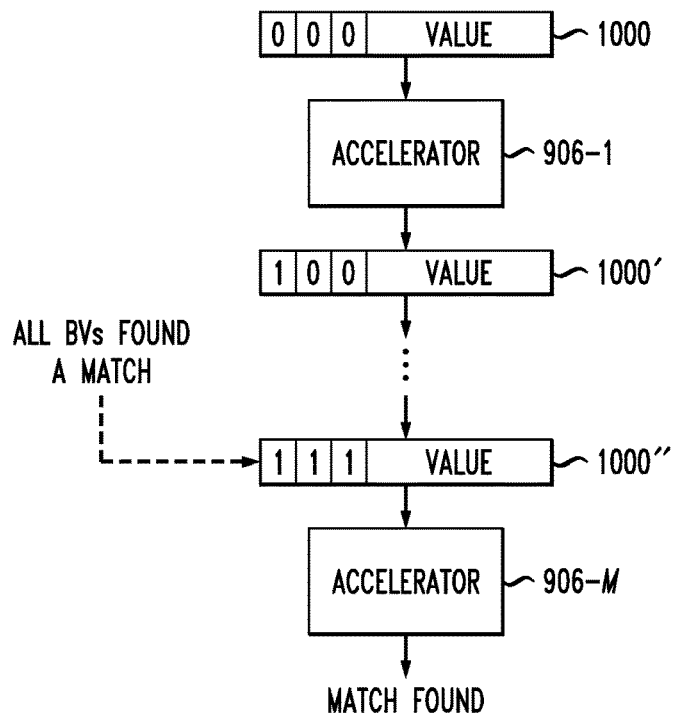
FIG. 10 illustrates transfer of data packets between hardware accelerators, according to an embodiment of the invention.

FIG. 10 shows a value which is streamed from accelerator 906-1 through accelerator 906-M where a match is found. A packet 1000 is streamed to the first accelerator 906-1. Initially, the packet 1000 has all of its match flags set to 0. The phase flag, not explicitly shown in the packet 1000 shown in FIG. 10, may be set to a value indicating that the probe phase is to be performed. Accelerator 906-1 computes the hash of the value in packet 1000 using N hash functions for each of the bit vectors. Each index value is verified to be within a range and used to get the bit vector's values. Match flags from the incoming packet 1000 are ORed with the values from the bit vectors and the result is repackaged into the outgoing packet 1000'. The values of the bit vectors in this example are assumed to be 0 if the index is out of range.

In the FIG. 10 example, the accelerator 906-1 finds a match for the first index, and thus the match flag for the first index is switched to 1. The updated packet 1000' is then sent to the next accelerator in the chain. This process is repeated in each of the accelerators in the daisy chain until the last accelerator, 906-M is reached. Accelerator 906-M does not need to repackage the packet 1000", but instead streams the value out or drops the value based on whether a match is found. In the FIG. 10 example, accelerator 906-M receives an updated packet 1000" where all match flags are set to 1, indicating that all bit vectors found a match. The accelerator 906-M thus streams the value in packet 1000" back to the host as a match.

Figure 11:
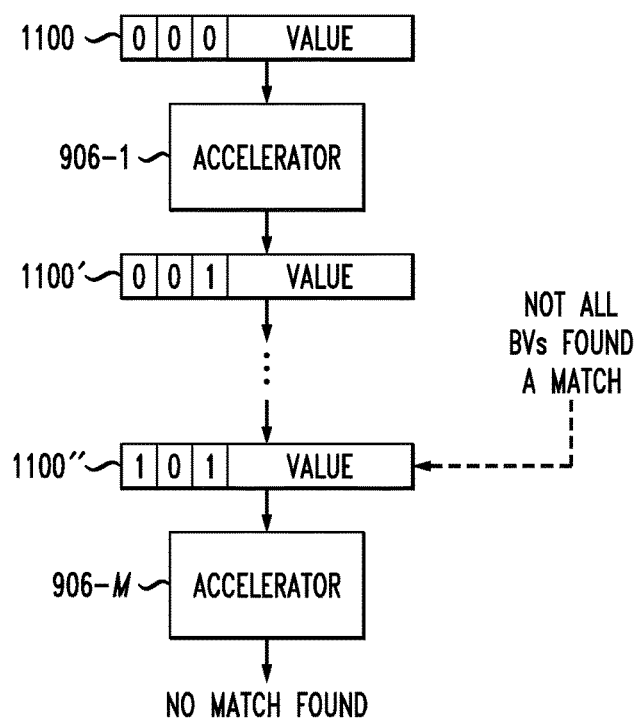
FIG. 11 illustrates another transfer of data packets between hardware accelerators, according to an embodiment of the invention.

FIG. 11 shows another example where a value is streamed from accelerator 906-1 through accelerator 906-M in packet 1100. Initially, the packet 1100 has all of its match flags set to 0. Again, the phase flag is not explicitly shown in FIG. 11. The accelerator 906-1 computes the hash of the value in packet 1100 using N hash functions for each of the bit vectors. The resulting indices are verified to be within range and used to get the bit vector's values. Match flags from the incoming packet 1100 are ORed with the values from the bit vectors and the result is repackaged into the outgoing packet 1100'.

In the FIG. 11 example, the accelerator 906-1 finds a match for the third index, and thus the match flag for the third index is switched to 1 for the updated packet 1100'. This process is repeated for the other accelerators in the daisy chain until the last accelerator 906-M is reached. Accelerator 906-M receives updated packet 1100" where the second match flag is set to 0, indicating that not all bit vectors have found a match. The accelerator 906-M thus drops the value in packet 1100" as a match is not found.

Figure 12:
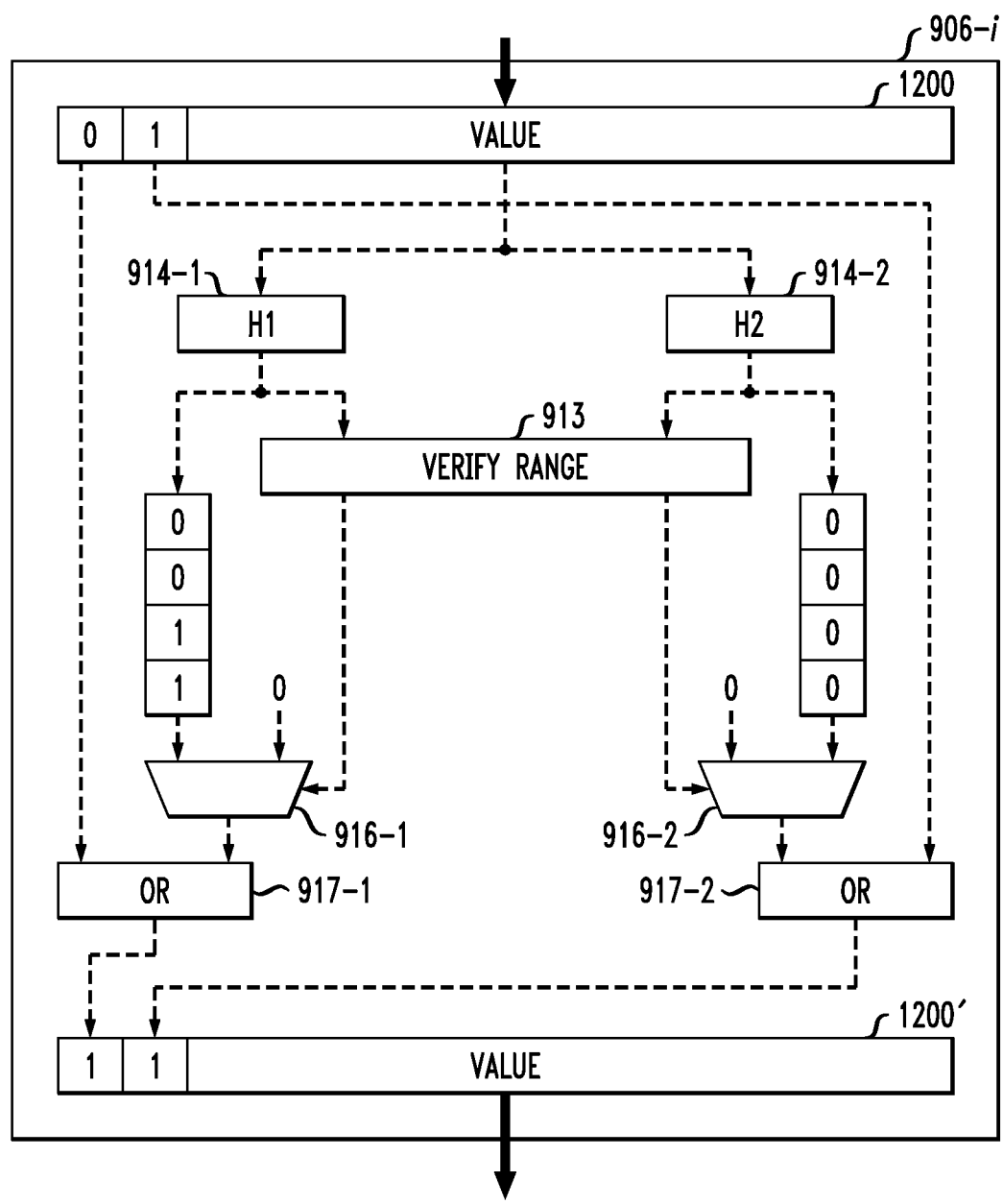
FIG. 12 illustrates a probe phase, according to an embodiment of the invention.

FIG. 12 shows in detail the processing of the probe phase in some embodiments. In particular, FIG. 12 shows the processing in an accelerator 906-$i$, where i is between 1 and M. The accelerator 906-$i$ receives a packet 1200 from the previous hardware accelerator in the chain, 906-($i$−1). The packet 1200 includes a value and two match flags. The first match flag is set to 0 while the second match flag is set to 1. The value of packet 1200 is hashed in each of hash functions 914-1 and 914-2. The hashed values or indices are then provided to verifier 913 to verify that the index is within the range of the accelerator 906-$i$. In addition, the hashed value from hash function 914-1 is provided to multiplexer 916-1 and the hashed value from hash function 914-2 is provided to multiplexer 916-2. Each of the multiplexers 916-1 and 916-2 also receives as input a 0.

The verifier 913 provides selection signals for the multiplexers 916-1 and 916-2. If the hashed value provided by hash function 914-1 is in range, then the selection signal for multiplexer 916-1 selects the hashed value as the output. Otherwise, the selection signal for multiplexer 916-1 selects 0 as the output. Similarly, the output of the multiplexer 916-2 is determined by a selection signal from the verifier 913, where the verifier determines the selection signal based on whether the hashed value from hash function 914-2 is in range.

The match flag for index 1 is ORed in block 917-1 with the output of the multiplexer 916-1. The match flag for index 2 is ORed in block 917-2 with the output of the multiplexer 916-2. In this manner, the match flag is propagated if it is already set to 1 or if the hashed value determined in the accelerator 906-$i$ for that index determines that a match is found. The outputs of OR blocks 917-1 and 917-2 are used to set the match flags for repackaged packet 1200', which is provided to the next accelerator in the chain, 906-($i$+1).

While a specific example of a build phase and probe phase have been described above, the build and probe phases used in various embodiments are not limited solely to the specific implementation and hardware architecture shown and described with respect to FIGS. 9-12.

More generally, for a plurality of accelerators connected in a daisy-chain fashion, the build and probe phases may proceed as follows. During the build phase, each accelerator updates the bit vector if a hash value of a portion of the streamed data is within the range of the bit vector partition on that accelerator. Thus, the build phase includes, at each accelerator connected in the daisy chain, computing one or more hashes of at least a portion of the data streamed to the hardware accelerator and updating at least one bit vector if the computed hashes are within a range of a corresponding partitioned portion of the at least one bit vector for that hardware accelerator.

During the probe phase, each accelerator probes the bit vector if the hash value of a portion of the streamed data is within the range of the bit vector partition on that accelerator. Thus, the probe phases includes, at each accelerator connected in the daisy chain, probing at least one bit vector if computed hashes for a portion of the streamed data are within the range of the corresponding partitioned portion of the at least one bit vector. Responsive to this probing, the accelerator generates probed bit values and passes the probed bit values to the next hardware accelerator in the daisy chain. The last one of the hardware accelerators in the daisy chain is configured to filter the streamed data utilizing the probed bit values.

In some embodiments, the data is streamed in the form of one or more packets, where each packet has a set of flags and a value. The set of flags includes a phase flag and two or more match flags. Each hardware accelerator in a daisy chain performs the build phase or the probe phase responsive to the value of the phase flag. In such embodiments, the probe phase includes, for a first accelerator in the daisy-chain, setting each of the match flags for a given packet to a first value. For each accelerator in the daisy-chain, the probe phase includes hashing the value of the given packet using two or more hash functions to compute two or more indices, each index corresponding to a respective one of the match flags, verifying whether each of the two or more indices are within the corresponding range of the current accelerator and, for each index within the corresponding range of the current accelerator, modifying the corresponding match flag to a second value. For the last accelerator in the daisy-chain, the probe phase includes determining whether each match flag for the given packet is set to the second value. If each match flag for the given packet is set to the second value, the last accelerator streams the value of the given packet to the processor as filtered data. If one or more match flags for the given packet is set to the first value, the last accelerator drops the value of the given packet.

One or more embodiments of the present invention may be a system, a method, and/or a computer program product. The computer program product may include a computer readable storage medium (or media) having computer readable program instructions thereon for causing a processor or host to carry out aspects of one or more embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a RAM, a ROM, an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, FPGAs, or programmable logic arrays (PLAs) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 13:
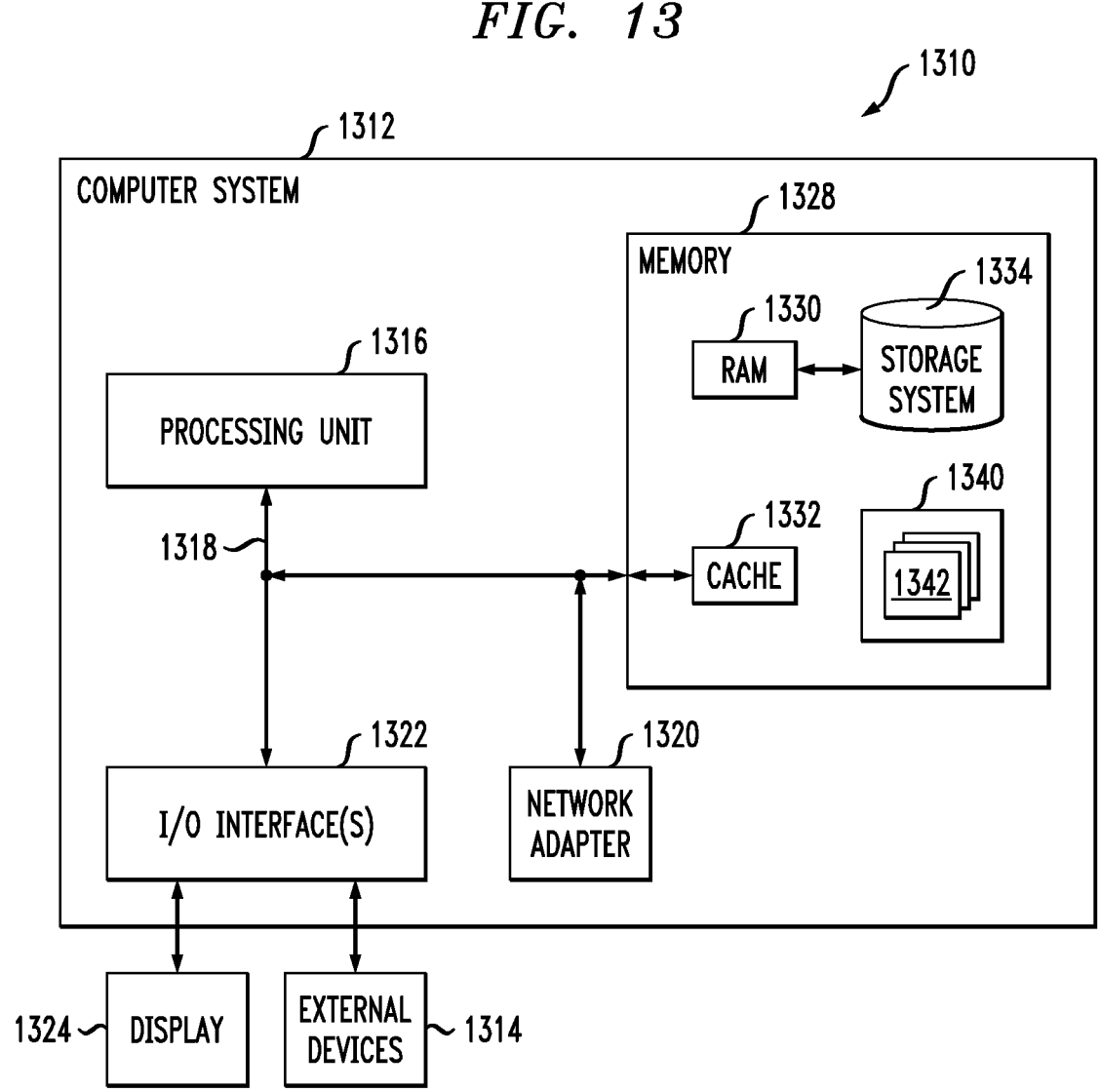
FIG. 13 depicts a computer system in accordance with which one or more components/steps of techniques of the invention may be implemented according to an embodiment of the invention.

One or more embodiments can make use of software running on a general-purpose computer or workstation. With reference to FIG. 13, in a computing node 1310 there is a computer system/server 1312, which is operational with numerous other general purpose or special purpose computing system environments or configurations. Examples of well-known computing systems, environments, and/or configurations that may be suitable for use with computer system/server 1312 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1312 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1312 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 13, computer system/server 1312 in computing node 1310 is shown in the form of a general-purpose computing device. The components of computer system/server 1312 may include, but are not limited to, one or more processors or processing units 1316, a system memory 1328, and a bus 1318 that couples various system components including system memory 1328 to processor 1316.

The bus 1318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture bus, Micro Channel Architecture (MCA) bus, Enhanced ISA (EISA) bus, Video Electronics Standards Association (VESA) local bus, and PCI bus.

The computer system/server 1312 typically includes a variety of computer system readable media. Such media may be any available media that is accessible by computer system/server 1312, and it includes both volatile and non-volatile media, removable and non-removable media.

The system memory 1328 can include computer system readable media in the form of volatile memory, such as RAM 1330 and/or cache memory 1332. The computer system/server 1312 may further include other removable/non-removable, volatile/nonvolatile computer system storage media. By way of example only, storage system 1334 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 1318 by one or more data media interfaces. As depicted and described herein, the memory 1328 may include at least one program product having a set (e.g., at least one) of program modules that are configured to carry out the functions of embodiments of the invention. A program/utility 1340, having a set (at least one) of program modules 1342, may be stored in memory 1328 by way of example, and not limitation, as well as an operating system, one or more application programs, other program modules, and program data. Each of the operating system, one or more application programs, other program modules, and program data or some combination thereof, may include an implementation of a networking environment. Program modules 1342 generally carry out the functions and/or methodologies of embodiments of the invention as described herein.

Computer system/server 1312 may also communicate with one or more external devices 1314 such as a keyboard, a pointing device, a display 1324, etc., one or more devices that enable a user to interact with computer system/server 1312, and/or any devices (e.g., network card, modem, etc.) that enable computer system/server 1312 to communicate with one or more other computing devices. Such communication can occur via Input/output (I/O) interfaces 1322. Still yet, computer system/server 1312 can communicate with one or more networks such as a local area network (LAN), a general wide area network (WAN), and/or a public network (e.g., the Internet) via network adapter 1320. As depicted, network adapter 1320 communicates with the other components of computer system/server 1312 via bus 1318. It should be understood that although not shown, other hardware and/or software components could be used in conjunction with computer system/server 1312. Examples include, but are not limited to, microcode, device drivers, redundant processing units, external disk drive arrays, RAID systems, tape drives, and data archival storage systems, etc.

The flowchart and block diagrams in FIGS. 1-13 illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. In addition, particular features described above with respect to a particular embodiment of the invention are not necessarily limited solely to use in the particular embodiment described. Instead, a single embodiment may include features described above in the context of two or more different embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
streaming, utilizing a processor coupled to a memory, data from the memory to a first one of a plurality of hardware accelerators;
filtering the data in the plurality of hardware accelerators utilizing at least one bit vector partitioned across at least two of the plurality of hardware accelerators; and
receiving filtered data at the processor from a second one of the plurality of hardware accelerators;
wherein the plurality of hardware accelerators are daisy-chain connected to one another;
wherein filtering the data in the plurality of hardware accelerators comprises, in each of the plurality of hardware accelerators, performing a build phase and a probe phase;
wherein performing the build phase comprises:
computing one or more hashes of the streamed data; and
updating the at least one bit vector if the computed hashes are within a range of a corresponding partitioned portion of the at least one bit vector; and
wherein performing the probe phase comprises:
probing the at least one bit vector if the computed hashes are within the range of the corresponding partitioned portion of the at least one bit vector;
generating one or more probed bit values responsive to the probing; and
passing the probed bit values to a next hardware accelerator in the daisy chain; and
wherein the second hardware accelerator comprises a last one of the hardware accelerators in the daisy chain; and
wherein filtering the data in the plurality of hardware accelerators further comprises the second hardware accelerator utilizing the probed bit values passed from at least one other one of the plurality of hardware accelerators to determine whether to: (i) pass a given packet in the streamed data to the processor as part of the filtered data; or (ii) drop the given packet.

2. The method of claim 1, wherein at least one of the plurality of hardware accelerators comprises a field-programmable gate array.

3. The method of claim 1, wherein filtering the data in the plurality of hardware accelerators comprises, in each of the plurality of hardware accelerators, utilizing one or more hash functions to compute bit vector indices for its corresponding partitioned portion of the at least one bit vector.

4. The method of claim 1, further comprising:
computing bit vector indices for the at least one bit vector utilizing one or more hash functions in a given one of the plurality of hardware accelerators; and
forwarding the bit vector indices for the at least one bit vector to other ones of the plurality of hardware accelerators.

5. A method comprising:
streaming, utilizing a processor coupled to a memory, data from the memory to a first one of a plurality of hardware accelerators;
filtering the data in the plurality of hardware accelerators utilizing at least one bit vector partitioned across at least two of the plurality of hardware accelerators; and
receiving filtered data at the processor from a second one of the plurality of hardware accelerators;
wherein the plurality of hardware accelerators are daisy-chain connected to one another;
wherein filtering the data in the plurality of hardware accelerators comprises, in each of the plurality of hardware accelerators:
receiving one or more packets each comprising a set of flags and a value, the set of flags comprising a phase flag and two or more match flags; and
performing one of a build phase and a probe phase responsive to the value of the phase flag;
wherein the second hardware accelerator comprises a last one of the hardware accelerators in the daisy chain; and
wherein filtering the data in the plurality of hardware accelerators further comprises the second hardware accelerator utilizing values of match flags passed from the other ones of the plurality of hardware accelerators to determine whether to: (i) pass a given packet in the streamed data to the processor as part of the filtered data; or (ii) drop the given packet.

6. The method of claim 5, wherein the build phase comprises programming each of the plurality of hardware accelerators with a corresponding range of said at least one bit vector.

7. The method of claim 6, wherein the probe phase comprises, for a first hardware accelerator in the daisy-chain, setting each of the match flags for a given packet to a first value.

8. The method of claim 7, wherein the probe phase comprises, for each hardware accelerator in the daisy-chain:
hashing the value of the given packet using two or more hash functions to compute two or more indices, each index corresponding to a respective one of the match flags;
verifying whether each of the two or more indices are within the corresponding range of a current hardware accelerator of the daisy-chain; and
for each index within the corresponding range of the current hardware accelerator, modifying the corresponding match flag to a second value.

9. The method of claim 8, wherein the probe phase comprises, for the last hardware accelerator in the daisy-chain:
determining whether each match flag for the given packet is set to the second value;
if each match flag for the given packet is set to the second value, streaming the value of the given packet to the processor as filtered data; and
if one or more match flags for the given packet is set to the first value, dropping the value of the given packet.

10. The method of claim 1, wherein the plurality of hardware accelerators form a Bloom filter.

11. The method of claim 1, wherein filtering the data utilizing the plurality of hardware accelerators comprises performing a database join operation.

12. The method of claim 11, wherein the database join operation comprises a hash join.

13. The method of claim 1, wherein filtering the data utilizing the plurality of hardware accelerators comprises performing string matching in the streamed data.

14. The method of claim 5, wherein at least one of the plurality of hardware accelerators comprises a field-programmable gate array.

15. The method of claim 5, wherein each of the plurality of hardware accelerators is configured to utilize one or more hash functions to compute bit vector indices for its corresponding partitioned portion of the at least one bit vector.

16. The method of claim 15, further comprising:
    computing bit vector indices for the at least one bit vector utilizing one or more hash functions in a given one of the plurality of hardware accelerators; and
    forwarding the bit vector indices for the at least one bit vector to other ones of the plurality of hardware accelerators.

17. The method of claim 5, wherein the plurality of hardware accelerators form a Bloom filter.

18. The method of claim 5, wherein filtering the data utilizing the plurality of hardware accelerators comprises performing a database join operation.

19. The method of claim 18, wherein the database join operation comprises a hash join.

20. The method of claim 5, wherein filtering the data utilizing the plurality of hardware accelerators comprises performing string matching in the streamed data.

\* \* \* \* \*